United States Patent
Rebinger et al.

(10) Patent No.: US 12,220,969 B2
(45) Date of Patent: Feb. 11, 2025

(54) COOLING SYSTEM WITH A HEAT PUMP FUNCTION BASED ON AN EXTENDABLE BASE SYSTEM AND MOTOR VEHICLE WITH A COOLING SYSTEM OF THIS TYPE

(71) Applicant: AUDI AG, Ingolstadt (DE)

(72) Inventors: Christian Rebinger, Munich (DE); Dirk Schroeder, Manching (DE)

(73) Assignee: AUDI AG, Ingolstadt (DE)

( * ) Notice: Subject to any disclaimer, the term of this patent is extended or adjusted under 35 U.S.C. 154(b) by 161 days.

(21) Appl. No.: 17/928,704

(22) PCT Filed: Apr. 6, 2021

(86) PCT No.: PCT/EP2021/058833
§ 371 (c)(1),
(2) Date: Nov. 30, 2022

(87) PCT Pub. No.: WO2022/008112
PCT Pub. Date: Jan. 13, 2022

(65) Prior Publication Data
US 2023/0234421 A1 Jul. 27, 2023

(30) Foreign Application Priority Data
Jul. 6, 2020 (DE) ................... 10 2020 117 701.1

(51) Int. Cl.
*B60H 1/00* (2006.01)
*B60H 1/32* (2006.01)

(52) U.S. Cl.
CPC ..... *B60H 1/00899* (2013.01); *B60H 1/00278* (2013.01); *B60H 1/32281* (2019.05)

(58) Field of Classification Search
CPC ............ B60H 1/00899; B60H 1/00921; B60H 1/00278; B60H 1/3281; B60H 1/323;
(Continued)

(56) References Cited

U.S. PATENT DOCUMENTS

| 5,598,887 | A | 2/1997 | Keda et al. |
| 11,912,100 | B2 * | 2/2024 | Nicolas .............. B60H 1/00921 |
| 2012/0085114 | A1 * | 4/2012 | Graaf ..................... B60H 1/323 |
| | | | 62/238.7 |

FOREIGN PATENT DOCUMENTS

DE 19644583 B4 12/2004
DE 102010042127 A1 4/2012
(Continued)

OTHER PUBLICATIONS

Examination Report issued on Jan. 26, 2021, in corresponding German Application No. 102020117701.1, 10 pages.
(Continued)

*Primary Examiner* — Henry T Crenshaw
*Assistant Examiner* — Kamran Tavakoldavani
(74) *Attorney, Agent, or Firm* — Maier & Maier, PLLC

(57) ABSTRACT

A cooling system with a heat pump function for a motor vehicle is described, includes a base system with a refrigerant compressor. A directly or indirectly working external heat exchanger which is arranged downstream of the refrigerant compressor. A directly or indirectly working first evaporator as part of an air conditioning device for the interior air conditioning of the motor vehicle, arranged down-stream of the external heat exchanger and preceded by a first expansion element. At least one second evaporator as part of a cooling device of an electric drive or storage unit, which evaporator is arranged fluidically parallel to the first evaporator, and which is preceded by a second expansion element. At least one low-pressure side collector arranged downstream of the first and second evaporators, or at least one high-pressure side collector arranged downstream of the external heat exchanger and upstream of the first and second evaporators.

19 Claims, 12 Drawing Sheets

(58) Field of Classification Search
CPC .... B60H 2001/00307; B60H 2001/00949; F25B 40/00; F25B 5/00; F25B 6/00; F25B 2400/0403; F25B 2400/0409; F25B 2400/0411; F25B 2600/2519
See application file for complete search history.

(56) References Cited

FOREIGN PATENT DOCUMENTS

| | | |
|---|---|---|
| DE | 102011118162 A1 | 5/2013 |
| DE | 102012108731 A1 | 3/2014 |
| DE | 102012222594 A1 | 6/2014 |
| DE | 102013206626 A1 | 10/2014 |
| DE | 102016004999 B3 | 8/2017 |
| DE | 102018209769 A1 | 12/2019 |
| DE | 102018221280 A1 | 6/2020 |
| DE | 102018222101 A1 | 6/2020 |
| WO | 2019214927 A1 | 11/2019 |

OTHER PUBLICATIONS

International Search Report and Written Opinion issued on Jul. 12, 2021, in corresponding International Application No. PCT/EP2021/058833, 15 pages.
International Preliminary Report on Patentability issued on Jan. 10, 2023, in corresponding International Application No. PCT/EP2021/058833, 15 pages.

* cited by examiner

COOLING SYSTEM WITH A HEAT PUMP FUNCTION BASED ON AN EXTENDABLE BASE SYSTEM AND MOTOR VEHICLE WITH A COOLING SYSTEM OF THIS TYPE

FIELD

The invention relates to a cooling system with a heat pump function for a motor vehicle, comprising
  a base system designed in a minimal configuration with
    a refrigerant compressor;
    a directly or indirectly acting external heat exchanger which is arranged downstream of the refrigerant compressor; a first directly or indirectly acting evaporator as part of an air conditioning device for the interior air conditioning of the motor vehicle, which evaporator is arranged downstream of the external heat exchanger and which is preceded by a first expansion element;
    at least one second evaporator, in particular a chiller, as part of a cooling device of an electric drive or storage unit, which evaporator is arranged fluidically parallel to the first evaporator and which is preceded by a second expansion element;
    a single low-pressure side collector arranged downstream of the first and second evaporators, or a single high-pressure side collector arranged downstream of the external heat exchanger and upstream of the first and second evaporators.

Heat pump applications for motor vehicles are known, for example, from DE 10 2013 206 626 A1, DE 196 44 583 B4, and DE 10 2012 222 594 A1.

BACKGROUND

The applicant itself has filed multiple applications in which various operating methods or post-heating (reheat) methods for complex cooling systems in motor vehicles are presented. The previously known cooling systems for motor vehicles usually have a very complex structure to be able to carry out desired operating methods in an energy-efficient manner.

SUMMARY

The object on which the invention is based is seen as specifying a simplified cooling system with which energy-efficient operation, in particular also post-heating (reheat) operation, is made possible.

This object is achieved by a cooling system and by a motor vehicle.

Therefore, a cooling system with a heat pump function for a motor vehicle is proposed, comprising
  a base system designed in a minimal configuration with
    a refrigerant compressor;
    a directly or indirectly working external heat exchanger which is arranged down-stream of the refrigerant compressor;
    a first evaporator as part of an air conditioning device for the interior air conditioning of the motor vehicle, which evaporator is arranged downstream of the external heat exchanger and which is preceded by a first expansion element;
    at least one second evaporator, in particular a chiller, as part of a cooling device of an electric drive or storage unit, which evaporator is arranged fluidically parallel to the first evaporator and which is preceded by a second expansion element;
    at least one single low-pressure side collector arranged downstream of the first and second evaporators, or at least one single high-pressure side collector arranged downstream of the external heat exchanger and upstream of the first and second evaporators.

It is provided that the base system forms a primary line and, to achieve the heat pump function, can be fluidically connected to a secondary line which branches off from the base system downstream of the refrigerant compressor and which has a second heat exchanger working as a heat source for direct or indirect air heating, in particular a heating register which is part of the air conditioning device.

In such a cooling system, the base system forms the refrigerant circuit (AC circuit), wherein the first evaporator is used to cool air that is supplied to the vehicle interior. The base system or the refrigerant circuit is now supplemented by a secondary line which has a simple structure and in which a heating register is arranged. The second heat exchanger, in particular the heating register, can be used for directly or indirectly heating interior air. This structurally simple design of the cooling system with a heat pump function can be operated in particular when usable heat is available at the second evaporator (chiller), which is usually produced by the waste heat from the electrical drive or storage unit. It is also possible to use the second evaporator (chiller) to cover a lack of heat when the interior is air-conditioned in a post-heating or reheat mode. A post-heating or reheat operation with a balanced heat balance can also be implemented, wherein the heat requirement at the second heat exchanger (heating register) and the cooling capacity at the first evaporator in addition to the refrigerant compressor drive power and the heat transferred to the refrigerant are balanced out or are set so that air is supplied to the interior, which essentially meets the interior demand request, i.e., the interior does not currently have to be further heated or cooled.

In the cooling system, a valve arrangement can be provided downstream of the refrigerant compressor, which valve arrangement is adapted to optionally direct the flow of refrigerant optionally to the primary line or/and to the secondary line. This allows the interior to be switched, optionally, to either cooling or heating.

The cooling system can have an internal heat exchanger, which is preceded by the high-pres sure-side collector on the high-pressure side or which is preceded by the low-pres sure-side collector on the low-pressure side.

At least one check valve or a shut-off valve can be arranged downstream of the second heat exchanger, in particular a heating register, and upstream of the first expansion element or/and be adjustable such that refrigerant flow from the secondary line to the primary line is optionally enabled and refrigerant flow from the primary line to the secondary line is blocked.

A low-pressure-side branch can be arranged downstream of the first evaporator, which branch is connected to a suction section, wherein refrigerant can be suctioned off from the primary line or/and the secondary line through the branch section. This ensures that refrigerant can be extracted from an inactive branch to prevent a lack of refrigerant in the active branch or refrigerant circuit section.

A check valve can be provided between the first evaporator and the ow-pressure side branch, which prevents refrigerant from flowing back to the first evaporator.

A check valve can be arranged in the primary line downstream of the external heat exchanger in such a way that refrigerant, which is introduced in particular from the secondary line into the primary line, can be prevented from flowing back to the external heat exchanger.

An expansion element can be provided in the secondary branch downstream of the second heat exchanger, in particular the heating register, wherein the expansion element is preceding the external heat exchanger.

A bypass line which has an expansion element can branch off downstream of the high-pressure collector, wherein the bypass line ends between a check valve and the external heat exchanger, whereby the check valve is arranged between the high-pressure collector and the external heat exchanger. The check valve mentioned can also be replaced by a shut-off device that is open or closed depending on the operation. Such an embodiment is proposed in particular for the implementation of an air heat pump operation.

The cooling system can be adapted to be operated in a post-heating mode, in which the refrigerant, starting from the refrigerant compressor, flows successively through the following components of the cooling system: second heat exchanger, in particular heating register, in the secondary line and evaporator in the primary line.

Furthermore, the cooling system can be adapted to be operated in a triangular process, in which the refrigerant, starting from the refrigerant compressor, flows successively through the following components of the cooling system: second heat exchanger, in particular heating register, in the secondary line, second evaporator in the primary line with standing coolant in the cooling device that is assigned to the second evaporator.

The cooling system described above can be adapted to set the air heat pump operation or/and the water heat pump operation when a low-pressure collector is present selectively or in series or in parallel to provide heat for the cabin supply air flow.

The cooling system described above can be adapted to set the air heat pump operation or and the water heat pump operation when a high-pressure collector is present selectively or in parallel to provide heat for the cabin supply air flow.

In the cooling system, the base system can be configured as a basic module that can be coupled with or/and connected to, or/and integrated with at least one expansion module which has at least the secondary line and the second heat exchanger, in particular the heating register. This results in the option of a modular design of the cooling system. The cooling system can be adjusted in a simple manner, for example depending on the vehicle type and other configuration of the motor vehicle, and can be extended to include a simple heat pump function or a heat pump function that offers more options.

A motor vehicle, which is in particular an electrically or partially electrically driven motor vehicle, can be designed with a cooling system as described above.

BRIEF DESCRIPTION OF THE FIGURES

Other details, aspects and advantages of the present invention result from the following description of embodiments with reference to the figures. Wherein.

DETAILED DESCRIPTION

Figure 1:
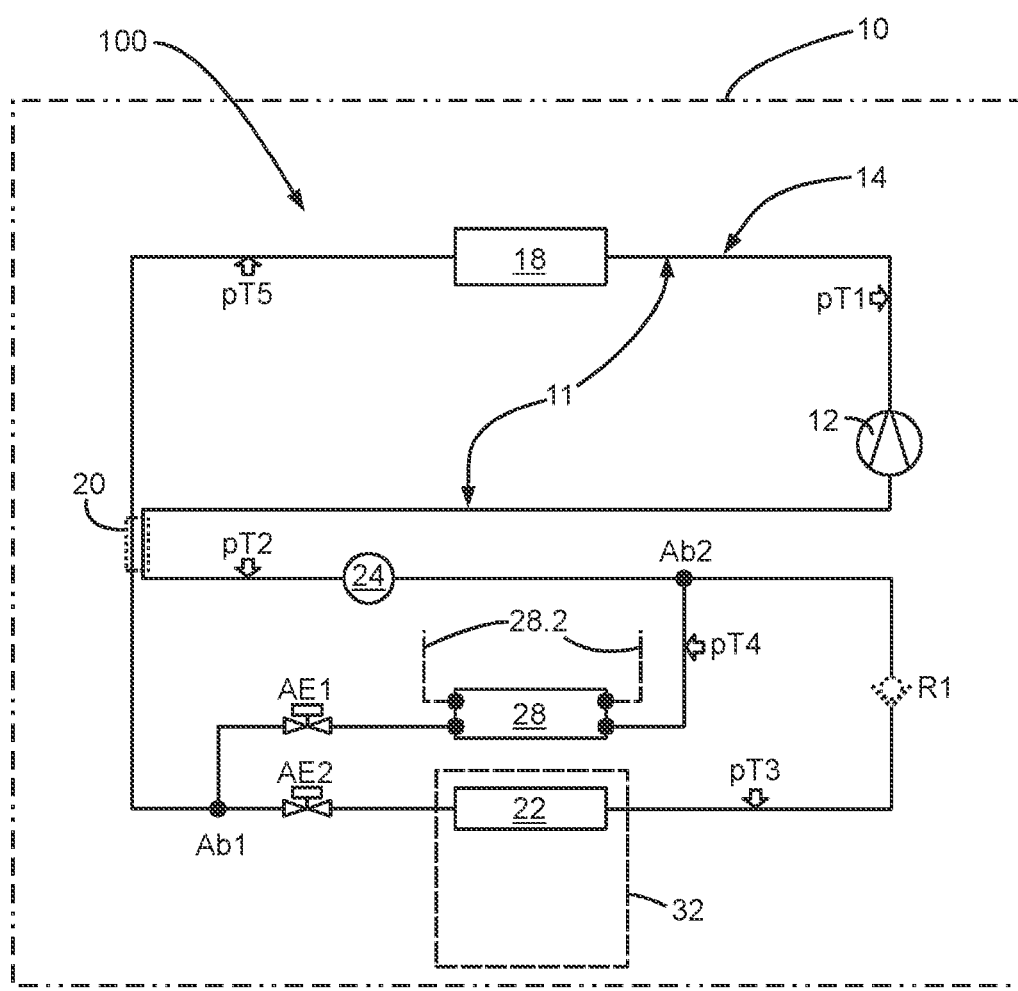
FIG. 1 shows a schematic and simplified circuit diagram of a base system of a cooling system with a low-pressure side collector.

FIG. 1 shows a schematic and simplified view of an embodiment of a cooling system 10 for a motor vehicle. The cooling system 10 comprises a refrigerant circuit 11 which can be operated in a cooling system mode (also called AC mode for short). The cooling system 10 comprises a refrigerant compressor 12, a directly or indirectly acting external heat exchanger 18, a first evaporator 22 and a low-pressure-side refrigerant collector 24 (low-pressure accu-mulator). A first expansion element, in particular an expansion valve AE2, is preceding the first evaporator 22. Starting from a branch Ab1, a second evaporator 28 (chiller) is arranged fluidically in parallel with the first evaporator 22. A second expansion element, in particular an expansion valve AE1, is preceding the second evaporator 28. On the low-pressure side, the outlet of the second evaporator or chiller 28 flows back into the refrigerant circuit 11 at the branch Ab2.

The first evaporator 22 is assigned to an air conditioning device 32 for the interior air conditioning of the motor vehicle. The second evaporator 28 is part of a cooling device (not shown) of an electric drive or storage unit of the motor vehicle, in particular the chiller 28 can be used for cooling a battery or/and an electric motor. The cooling device is represented in simplified form in FIG. 1 by coolant lines 28.2, in which a coolant, for example a water-glycol mixture, can circulate between the chiller 28 and the electrical component to be cooled.

The evaporator 22 is shown here by way of example as a front evaporator for a vehicle. The evaporator 22 is also representative of other evaporators possible in a vehicle, such as rear evaporators, which can be arranged fluidically parallel to one another. In other words, the cooling system 10 comprises at least one evaporator 22 (provided for interior air conditioning).

The cooling system can optionally have an internal heat exchanger 20, which is shown in dashed lines in FIG. 1.

The cooling system 10 shown in FIG. 1 represents a base system 100 with a low-pressure-side collector 24 that is adapted to cool the vehicle interior using the first evaporator 22 and to cool an electrical vehicle component using the second evaporator 28 (chiller). In the base system, the external heat exchanger 18 is configured as a condenser or gas cooler. The base system 100 can also be referred to as an AC system. The course of the line or topological refrigerant circuit shown in FIG. 1 is also referred to as primary line 14 below. In this example, the collector 24 is provided as the only the low-pressure side collector.

Figure 2:
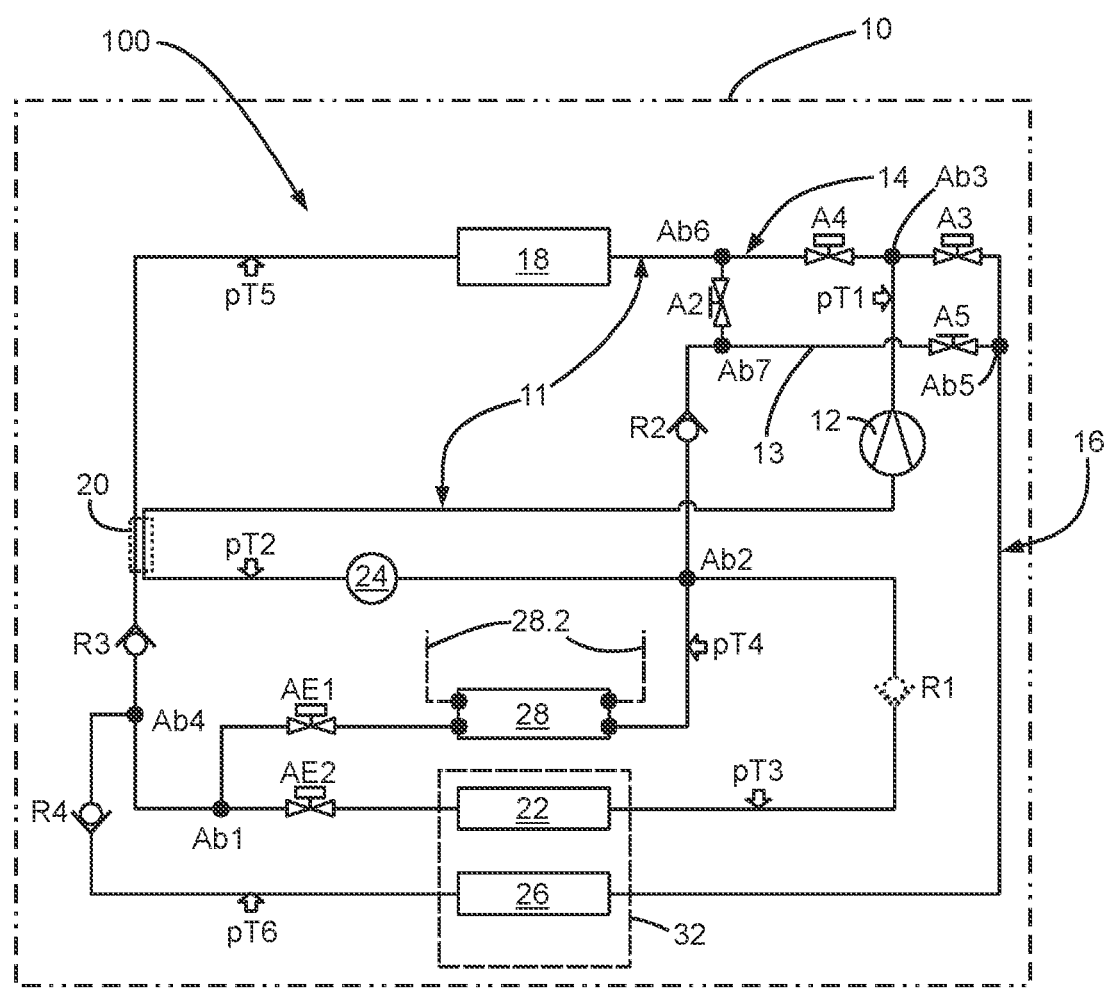
FIG. 2 shows a first expansion stage of the cooling system with heat pump function based on the base system of FIG. 1.

FIG. 2 shows a schematic and simplified view of the cooling system 10 with a low-pressure side refrigerant collector 24 and a simple heat pump function, in particular a water heat pump function. In this embodiment, the refrigerant circuit 11 is divided after the refrigerant compressor 12 into the primary line 14 mentioned above and a secondary line 16. The secondary line begins at the exemplary branch Ab3. At the branch Ab4, this branch leads back into the primary line 14 or the base system 100.

The cooling system 10 further comprises a second heat exchanger acting as a heat source, in particular a heating register 26 (also referred to as a heating condenser or heating gas cooler). A shut-off valve A3 is arranged upstream of the second heat exchanger or heating register 26. A check valve R4 is arranged downstream of the second heat exchanger or heating register 26. The second heat exchanger or the heating register 26 is part of the air conditioning device 32. The second heat exchanger is addressed or referred to in simplified terms as a heating register below, without this representing a restriction to the effect that another component that serves as a heat source can be used as the second heat exchanger.

As already mentioned above, the chiller 28 can be used to cool an electrical component of the vehicle, for example. In the embodiment shown here, however, it can also be used to implement a water heat pump function using the waste heat from at least one electrical component.

A check valve R3 is provided between the branch Ab4 and the external heat exchanger 18. The check valve R3 prevents refrigerant flowing in from the secondary line 16 at the branch Ab4 from reaching the external heat exchanger 18, such that it always routed in the direction of the first evaporator 22 and/or second evaporator 28.

A connecting line 13 in which a shut-off valve A5 is arranged is located between the secondary line 16 and the low-pressure side of the primary line 14. The connecting line extends between branches Ab2 and Ab5. Furthermore, a check valve R2 is provided in the connecting line 13. The connecting line is used in particular to remove or suction off refrigerant from the secondary line 16, which is closed by means of the shut-off valve A3, if there is a lack of refrigerant in the primary line in AC operation.

By opening or closing the two shut-off valves A3 and A4, the refrigerant conveyed by the refrigerant compressor 12 can be routed either into the primary line 14 or the secondary line 16. For example, if the refrigerant flow is routed to the secondary line 16 with the shut-off valve A4 closed (shut-off valve A3 open), the compressed and hot refrigerant flows to the heating register 26. The heating register 26 then serves as a heat source, where air for the interior ventilation of the vehicle can be heated directly or indirectly. When the shut-off valve A3 is open, the shut-off valve A5 in the connecting line 13 is closed. In such an interconnec-tion, in which the refrigerant is first routed via the secondary line 16 and the heating register 26 before it flows back into the primary line at Ab4, refrigerant can be removed or suctioned off as required from the connecting section 14.1, which is extends between the shut-off valve A4 and the check valve A3 and has the external heat exchanger 18, if a lack of refrigerant should occur in the heating mode.

The cooling system shown in FIG. 2 shows a structurally simple design with a heat pump function. The base system 100 (see FIG. 1) is essentially only supplemented by the heating register 26 (heat source) for heating the interior air and by multiple individual valves A2 to A5, which enable switching between AC operation and heating or heat pump operation, including a respective opening (A2 or A5) of suctioning off of the other, non-active line. It is pointed out that instead of the individual shut-off valves A2 to A5 shown here, a respectively designed multi-way valve can also be used. The multi-way valve would then be designed as if A4 and A5 are opened or closed at the same time and as if A2 and A3 are opened or closed at the same time, such that compressed refrigerant from the refrigerant compressor is passed into the primary line 14 or the secondary line 16 and suctioning off from the other line is enabled.

The cooling system with heat pump function shown in FIG. 2 can be operated, for example, when usable heat is available at the second evaporator 28 (chiller), which heat is generally produced by the waste heat from the electrical storage or drive components. Furthermore, the cooling system 10 can be operated in a post-heating or reheat mode, wherein a lack of heat is covered by the second evaporator 28 (chiller). Finally, the cooling system 10 can also be operated in this configuration with a balanced heat balance during post-heating or reheating operation.

Figure 2A:
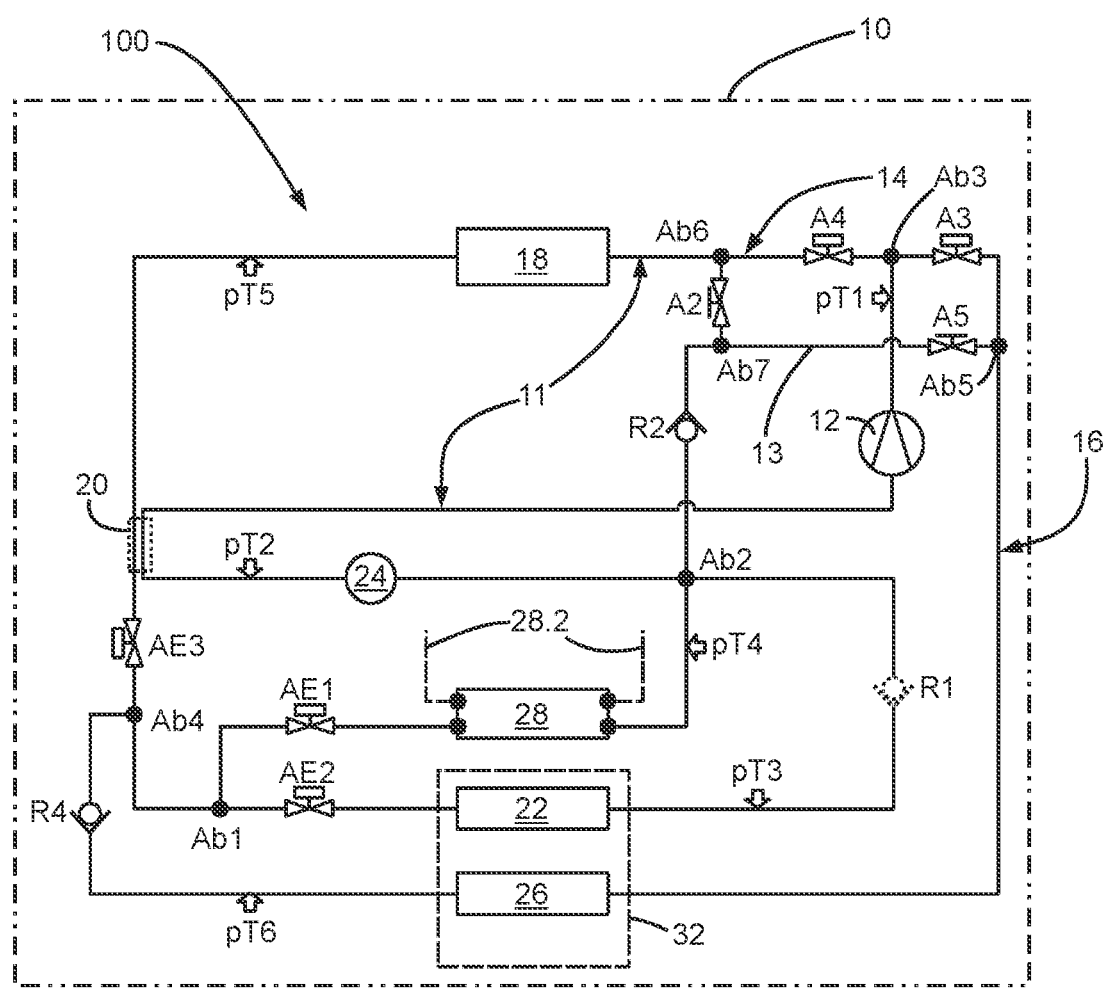
FIG. 2A shows a further expansion stage of the cooling system with heat pump function based on the base system of FIG. 1.

If there is no air flow at the chiller 28, a triangular process is possible via the same, wherein the refrigerant flows from the second heat exchanger (heating register) 26 via the expansion element AE1, the chiller 28, and via the branch point Ab2 to the refrigerant compressor 12. FIG. 2A shows an embodiment of the cooling system with a heat pump function that is slightly modified compared to FIG. 2. In this example, the shut-off valve A3 (FIG. 2) is replaced by an expansion element or expansion valve AE3. This makes it possible to connect the cooling system 10 in air heat pump operation when at least a partial flow of refrigerant coming from the second heat exchanger (heating register) 26 is expanded into the external heat exchanger via the expansion element AE3.

If there is no air flow at the external heat exchanger 18, a triangular process is also possible via the same, wherein the refrigerant flows from the second heat exchanger (heating register) 26 via the expansion element AE3, the external heat exchanger 18, and the open shut-off valve A2 to the refrigerant compressor 12.

Figure 3:
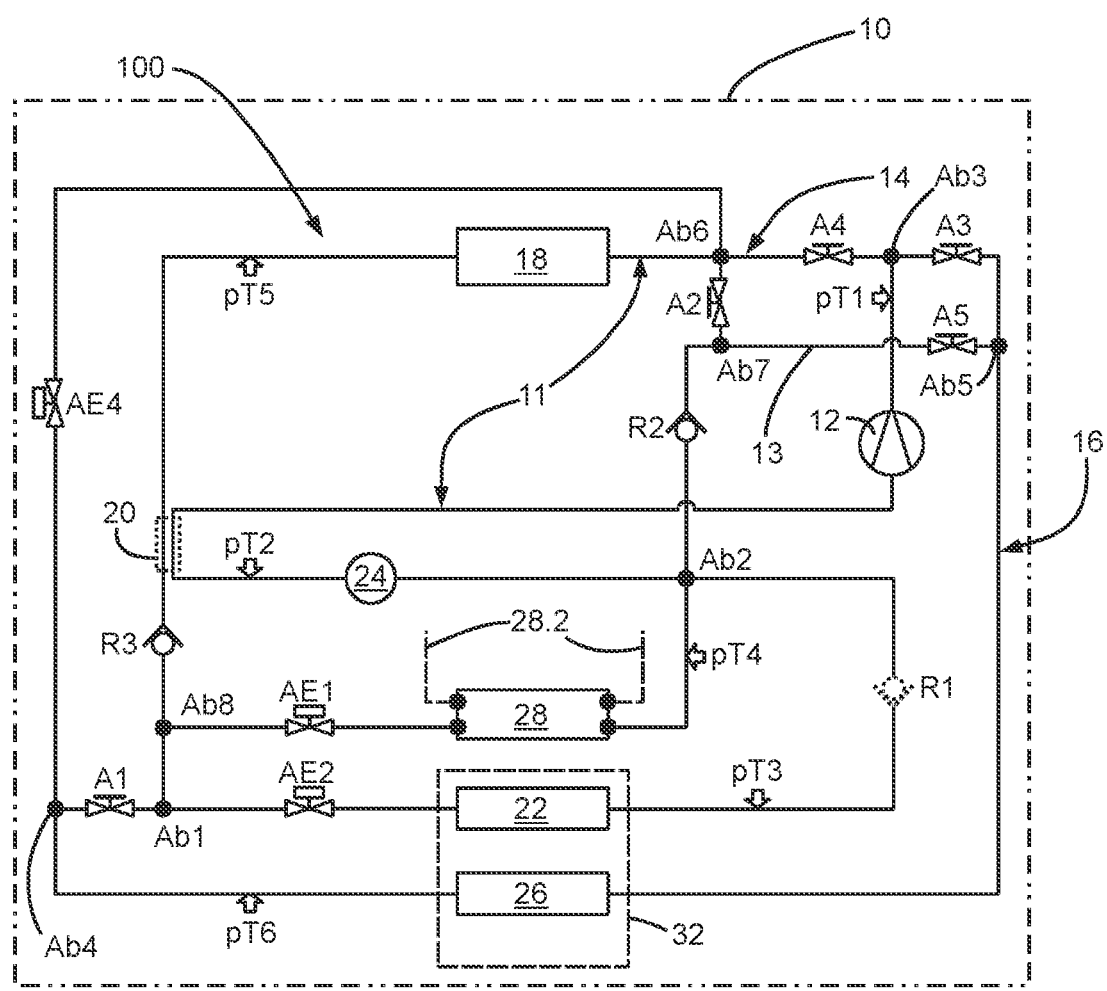
FIG. 3 shows a further expansion stage of the cooling system with heat pump function based on the base system of FIG. 1.

FIG. 3 shows a simplified and schematic representation of a cooling system 10 in which the heat pump function according to the configuration in FIG. 2 is still possible and in which excess heat can also be released in reheat mode.

For this purpose, the secondary branch is extended downstream of the heating register 26 and has an expansion valve AE4, which is connected upstream of the external heat exchanger 18. A shut-off valve A1 is provided between the branch Ab4 and the branch Ab1. In this enhanced embodiment of the cooling system 10 with a heat pump function in comparison to FIG. 2, excess heat can be dissipated via the expansion valve AE4 and the external heat exchanger 18 in a post-heating or reheating operation. The check valves A2 and A4 are closed. The refrigerant then flows from the external heat exchanger 18 in the direction of the first evaporator 22 or the second evaporator (chiller) 28.

Figure 3A:
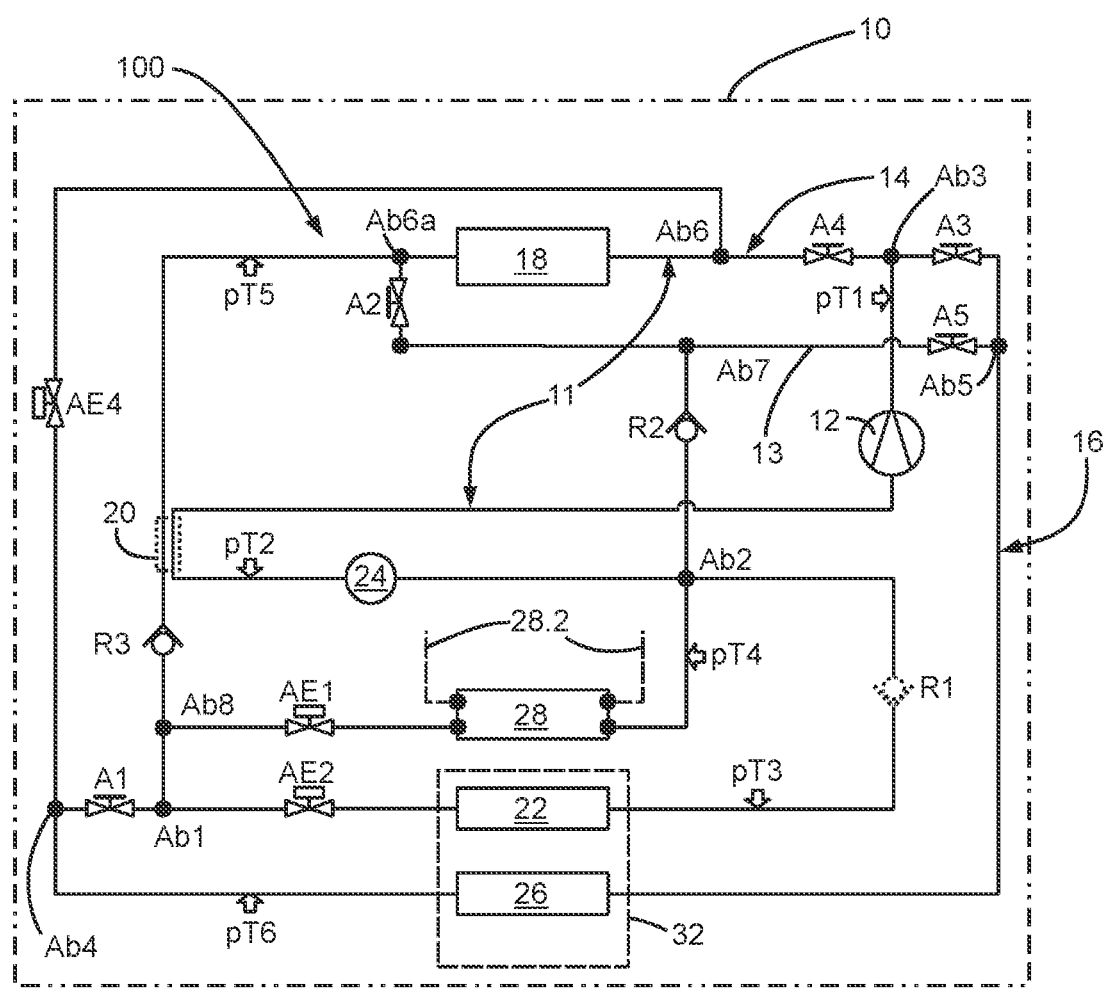
FIG. 3A shows a further expansion stage of the cooling system with heat pump function based on the base system of FIG. 1.

FIG. 3A shows a modification of the cooling system 10 of FIG. 3. Here, the shut-off valve A2 is fluidically arranged on the other side of the external heat exchanger 18. In other words, the shut-off valve A2 or an associated branch Ab6a is arranged downstream of the external heat exchanger 18. As a result, the air heat pump operation can be represented in principle via the expansion element AE4 and the check valve R3. In addition, however, a triangular process is also possible if the air is standing still at the external heat exchanger 18 and its active air-side throughflow is prevented.

Figure 4:
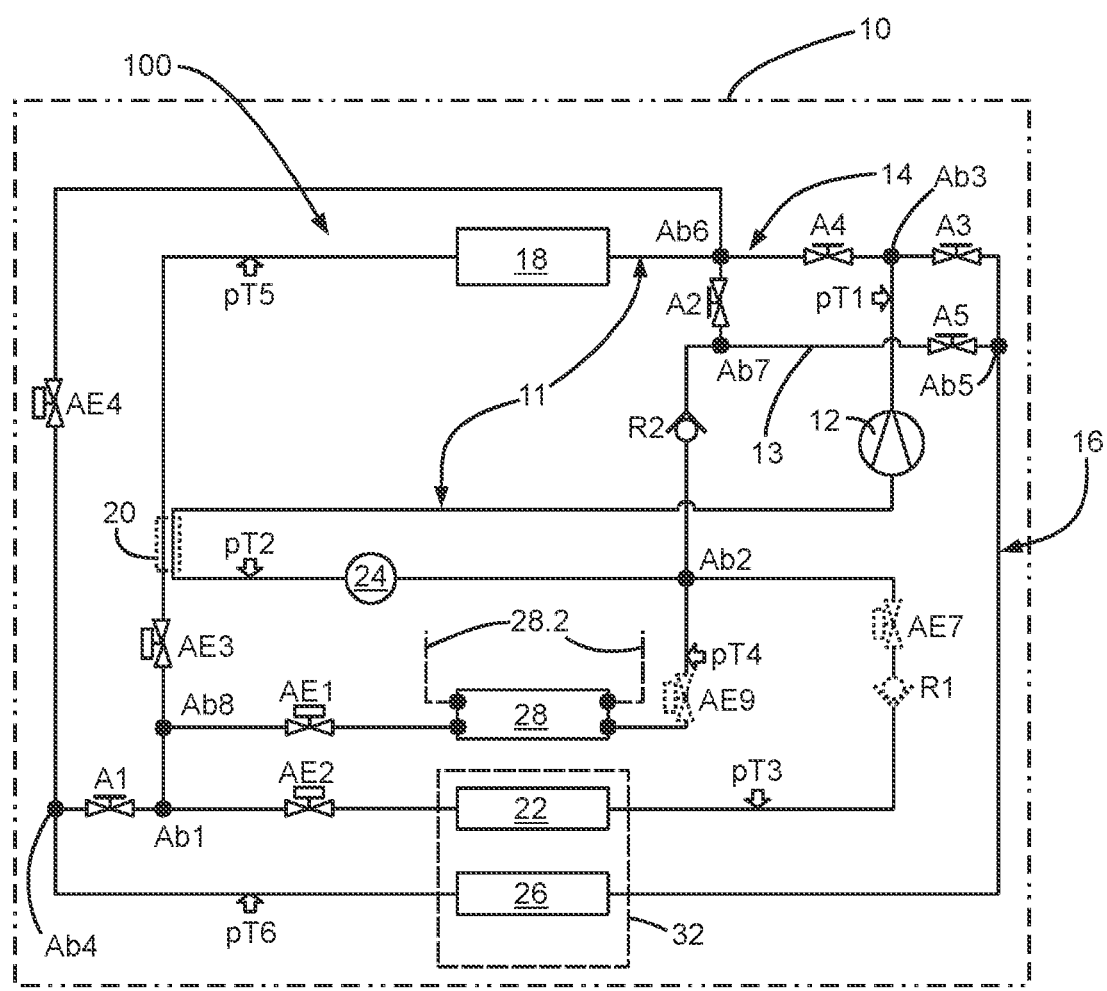
FIG. 4 shows a further expansion stage of the cooling system with heat pump function based on the base system of FIG. 1.

FIG. 4 shows a simplified and schematic representation of a cooling system 10 in which the heat pump function according to the configuration of FIG. 2 or FIG. 3 is still possible and in which an air heat pump function is additionally enabled. For this purpose, another expansion element AE3 is provided instead of the check valve R3 as in FIG. 2. The air heat pump connection is achieved when shut-off valve A1 is open and expansion valve AE4 is closed. Correspondingly, refrigerant that comes from the heating register 26 can be supplied to the external heat exchanger 18 via the (partially) open expansion valve AE3. The refrigerant can be supplied to the first or/and second evaporator 22, 28 fluidically parallel thereto. After the refrigerant has passed through the external heat exchanger 18, it flows back in the direction of the low-pressure side refrigerant collector 24 when the shut-off valve A2 is open.

Figure 4A:
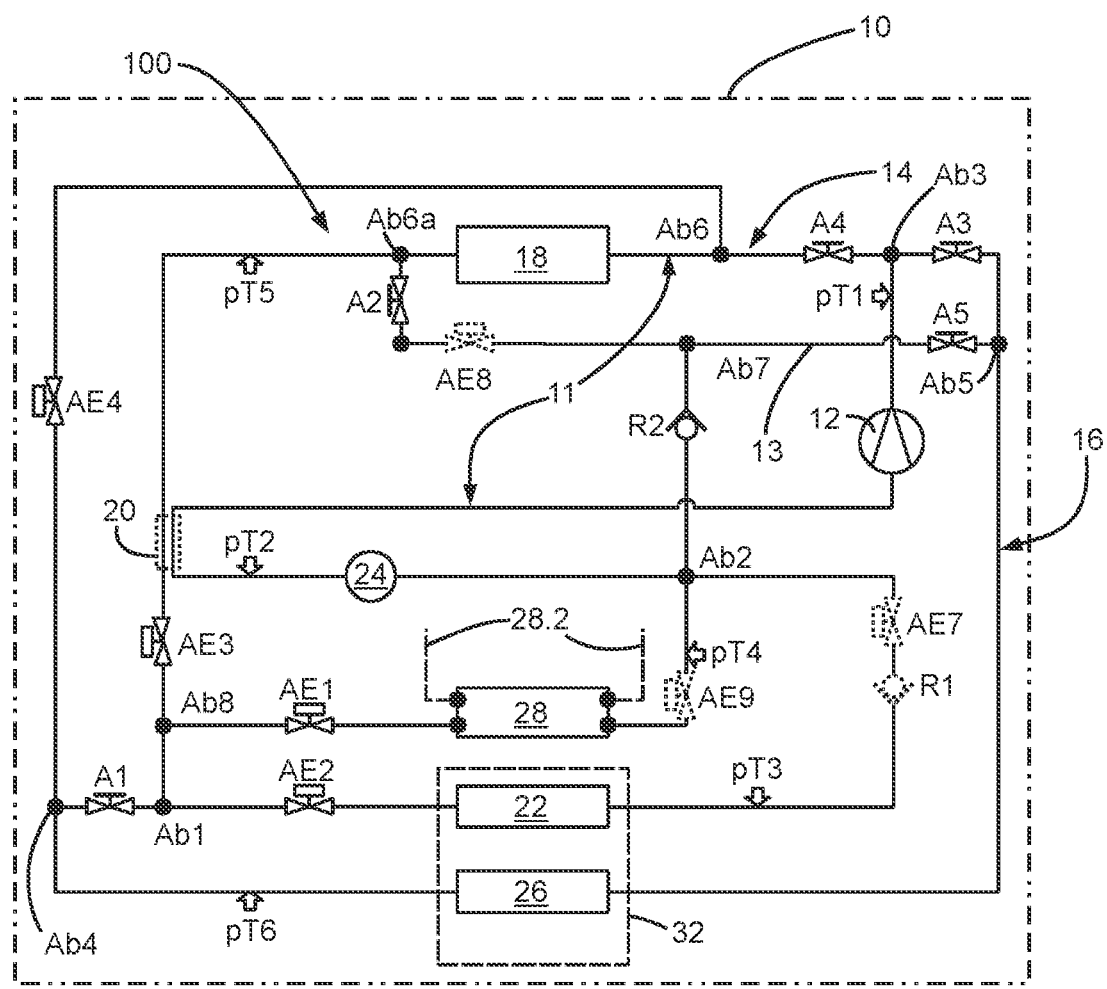
FIG. 4A shows a further expansion stage of the cooling system with heat pump function based on the base system of FIG. 1.

FIG. 4A shows a modification of the cooling system 10 of FIG. 4. Here, the shut-off valve A2 is fluidically arranged on the other side of the external heat exchanger 18. In other words, the shut-off valve A2 or an associated branch Ab6a is arranged downstream of the external heat exchanger 18. As a result, the air heat pump operation can be represented in principle via AE4 and R3. In addition, however, a triangular process is also possible if the air is standing still at the external heat exchanger 18. If a shut-off element in the form of a check valve R3 is used instead of an expansion element AE3, an air heat pump can also be connected in series to a water heat pump via the heat exchangers 18 and 28, which, in addition to operation at the same low pressure level in the chiller 28 compared to heat exchanger 18, allows setting a lower pressure level by throttling AE1 which in turn can be advantageous when the system starts up.

The cooling systems 10 described above with the low-pressure collector 24, in particular those in FIGS. 2 to 4A, enable selective or serial or parallel water heat pump operation (via chiller 28) depending on the connection selected or/and air heat pump operation (via external heat exchanger 18) to provide heat to the cabin airflow.

Figure 5:
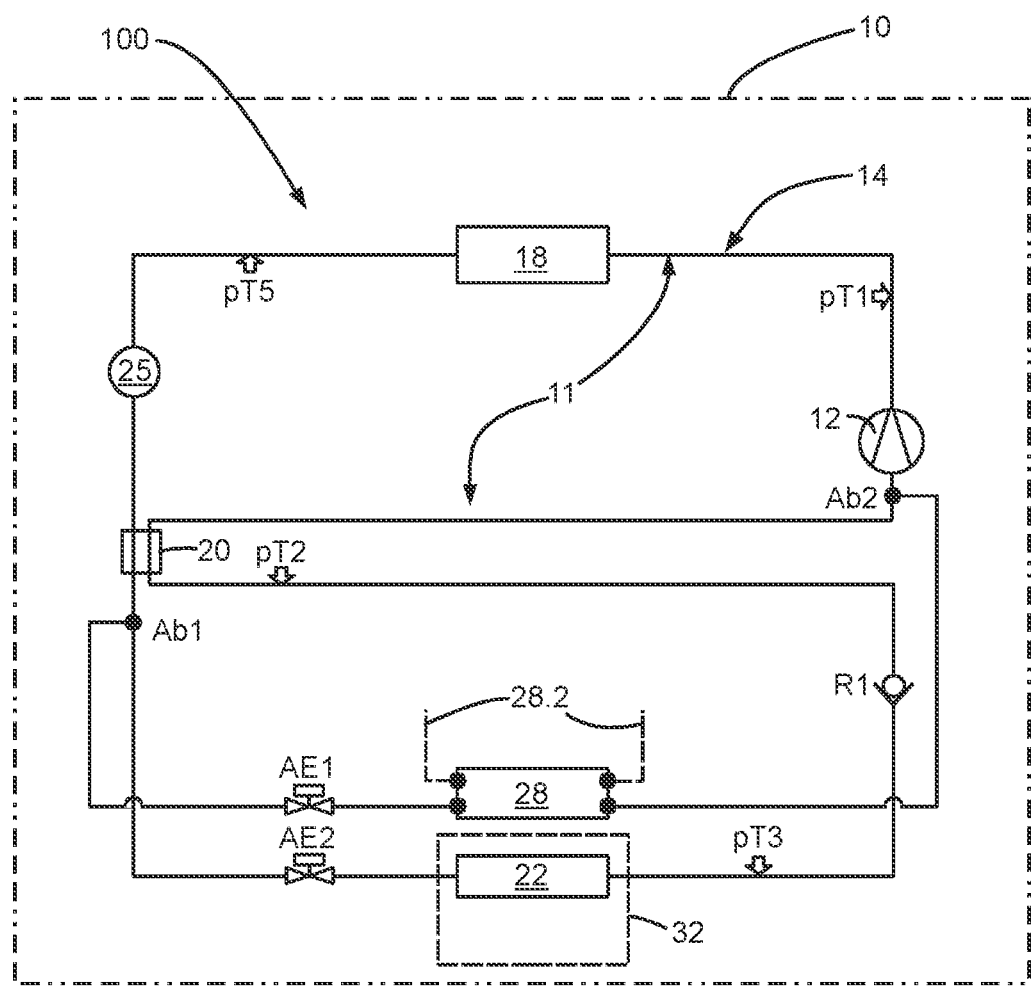
FIG. 5 shows a schematic and simplified circuit diagram of a base system of a cooling system with a high-pressure side collector.

FIG. 5 shows a schematic and simplified view of an embodiment of a cooling system 10 for a motor vehicle. The cooling system 10 comprises a refrigerant circuit 11 which can be operated in a cooling system mode (also called AC mode for short). The cooling system 10 comprises a refrigerant compressor 12, an external heat exchanger 18, a first evaporator 22, and a high-pressure-side refrigerant collector 25 (high-pressure collector). A first expansion valve AE2 is preceding the first evaporator 22. Starting from a branch Ab1, a second evaporator 28 (chiller) is arranged fluidically in parallel with the first evaporator 22. A second expansion valve AE1 is preceding the second evaporator 28 On the low-pressure side, the outlet of the second evaporator or chiller 28 flows leads back into the refrigerant circuit 11 at the branch Ab2. The branch Ab2 is located downstream of an internal heat exchanger 20. The first evaporator 22 is assigned to an air conditioning device 32 for the interior air conditioning of the motor vehicle. The second evaporator 28 is part of a cooling device (not shown) of an electric drive or storage unit of the motor vehicle, in particular the chiller 28 can be used for cooling a battery or/and an electric motor. The cooling device is represented in simplified form in FIG. 1 by coolant lines 28.2, in which a coolant, for example a water-glycol mixture, can circulate between the chiller 28 and the electrical component to be cooled.

The evaporator 22 is shown here by way of example as a front evaporator for a vehicle. The evaporator 22 is also representative of other evaporators possible in a vehicle, such as rear evaporators, which can be arranged fluidically parallel to one another. In other words, the cooling system 10 comprises at least one evaporator 22 (provided for interior air conditioning).

The cooling system 10 shown in FIG. 5 represents a base system 100 with a high-pressure-side collector 25 that is adapted to cool the vehicle interior using the first evaporator 22 and to cool an electrical vehicle component using the second evaporator 28 (chiller). In the base system, the external heat exchanger 18 is configured as a condenser. The base system 100 can also be referred to as an AC system. The course of the line or topological refrigerant circuit shown in FIG. 5 is also referred to as primary line 14 below. In this example, the collector 25 is provided as the only low-pressure side collector.

Figure 6:
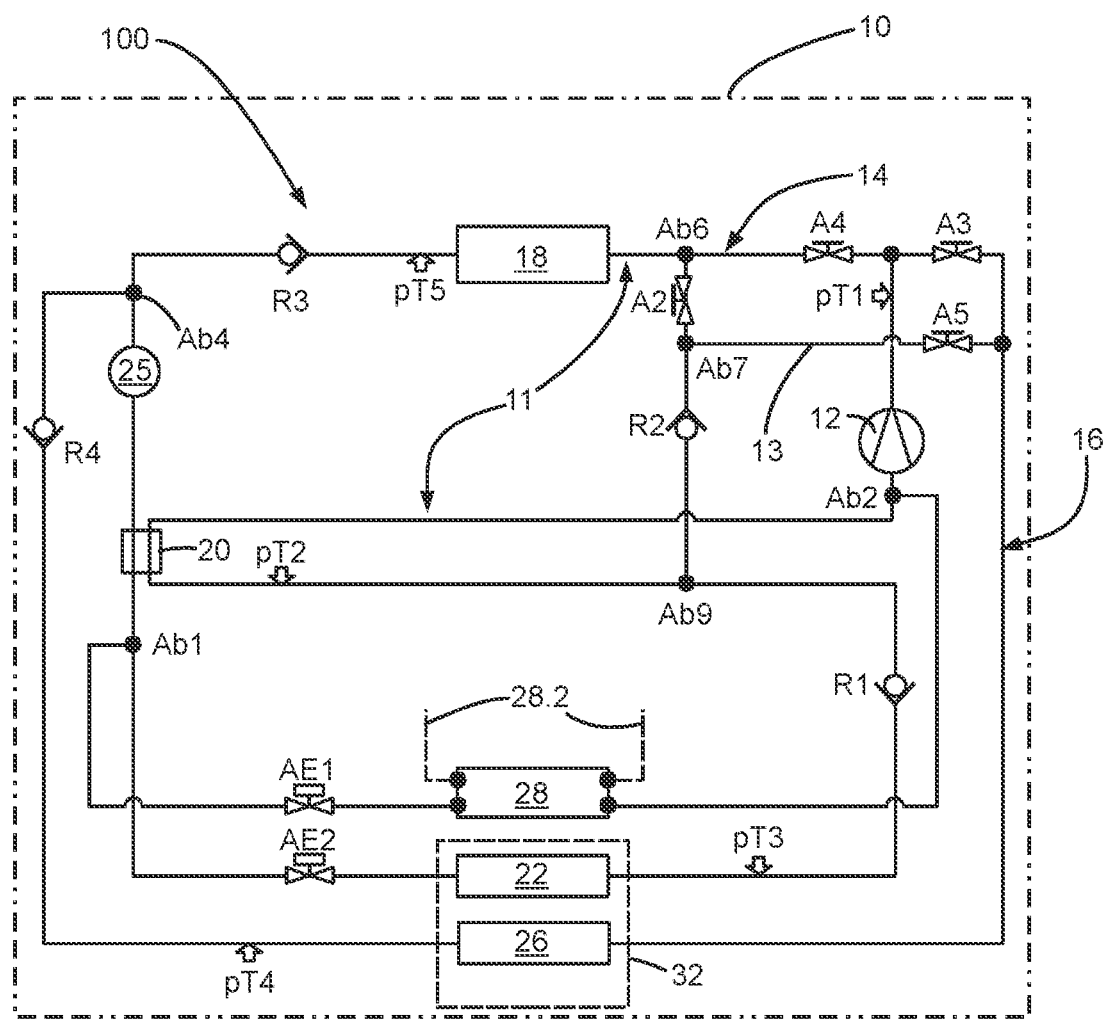
FIG. 6 shows a first expansion stage of the cooling system with heat pump function based on the base system of FIG. 5.

FIG. 6 shows a schematic and simplified view of the cooling system 10 with a high-pressure side refrigerant collector 25 and a simple heat pump function, in particular a water heat pump function. In this configuration, the refrigerant circuit 11 is divided after the refrigerant compressor 12 into the primary line 14 mentioned above and a secondary line 16. The secondary line begins at the exemplary branch Ab3. At the branch Ab4, this branch leads back into the primary line 14 or the base system 100.

The cooling system 10 further comprises a heating register 26 (also referred to as heating condenser). A shut-off valve A3 is arranged upstream of the heating register 26. A check valve R4 is arranged downstream of the heating register 26. The heating register 26 is part of the air conditioning device 32.

As already mentioned above, the chiller 28 can be used to cool an electrical component of the vehicle, for example. In the embodiment shown here, however, it can also be used to implement a water heat pump function using the waste heat from at least one electrical component.

A check valve R3 is provided between the branch Ab4 and the external heat exchanger 18. The check valve R3 prevents refrigerant flowing in from the secondary line 16 at the branch Ab4 from reaching the external heat exchanger 18, such that it always routed in the direction of the first evaporator 22 and/or second evaporator 28.

A connecting line 13 in which a shut-off valve A5 is arranged is located between the secondary line 16 and the low-pressure side of the primary line 14. The connecting line extends between branches Ab5 and Ab9. Furthermore, a check valve R2 is provided in the connecting line 13. The connecting line is used in particular to remove or suction off refrigerant from the secondary line 16, which is closed by means of the shut-off valve A3, if there is a lack of refrigerant in the primary line in AC operation.

By opening or closing the two shut-off valves A3 and A4, the refrigerant conveyed by the refrigerant compressor 12 can be routed either into the primary line 14 or the secondary line 16. For example, if the refrigerant flow is routed to the secondary line 16 with the shut-off valve A4 closed (shut-off valve A3 open), the compressed and hot refrigerant flows to the heating register 26. The heating register 26 then serves as a heat source, where air for the interior ventilation of the vehicle can be heated directly or indirectly. When the shut-off valve A3 is open, the shut-off valve A5 in the connecting line 13 is closed. In such an interconnec-tion, in which the refrigerant is first routed via the secondary line 16 and the heating register 26 before it flows back into the primary line at Ab4, refrigerant can be removed or suctioned off as required from the connecting section 14.1, which extends between the shut-off valve A4 and the check valve A3 and has the external heat exchanger 18, if a lack of refrigerant should occur in the heating mode.

The cooling system shown in FIG. 6 shows a structurally simple design with a heat pump function. The base system 100 (see FIG. 5) is substantially only supplemented by the heating register 26 (heat source) for heating the interior air and by multiple individual valves A2 to A5, which enable switching between AC operation and heating or heat pump operation, including a respective opening (A2 or A5) of suctioning off of the other, non-active line. It is pointed out that instead of the individual shut-off valves A2 to A5 shown here, a respectively designed multi-way valve can also be used. The multi-way valve would then be designed as if A4 and A5 are opened or closed at the same time and as if A2 and A3 are opened or closed at the same time, such that compressed refrigerant from the refrigerant compressor is passed into the primary line 14 or the secondary line 16 and suctioning off from the other line is enabled.

The cooling system with heat pump function shown in FIG. 6 can be operated, for example, when usable heat is available at the second evaporator 28 (chiller), which heat is generally produced by the waste heat from the electrical storage or drive components. Furthermore, the cooling system 10 can be operated in a post-heating or reheat mode, wherein a lack of heat is covered by the second evaporator 28 (chiller). Finally, the cooling system 10 can also be operated in this configuration with a balanced heat balance during post-heating or reheating operation.

Figure 7:
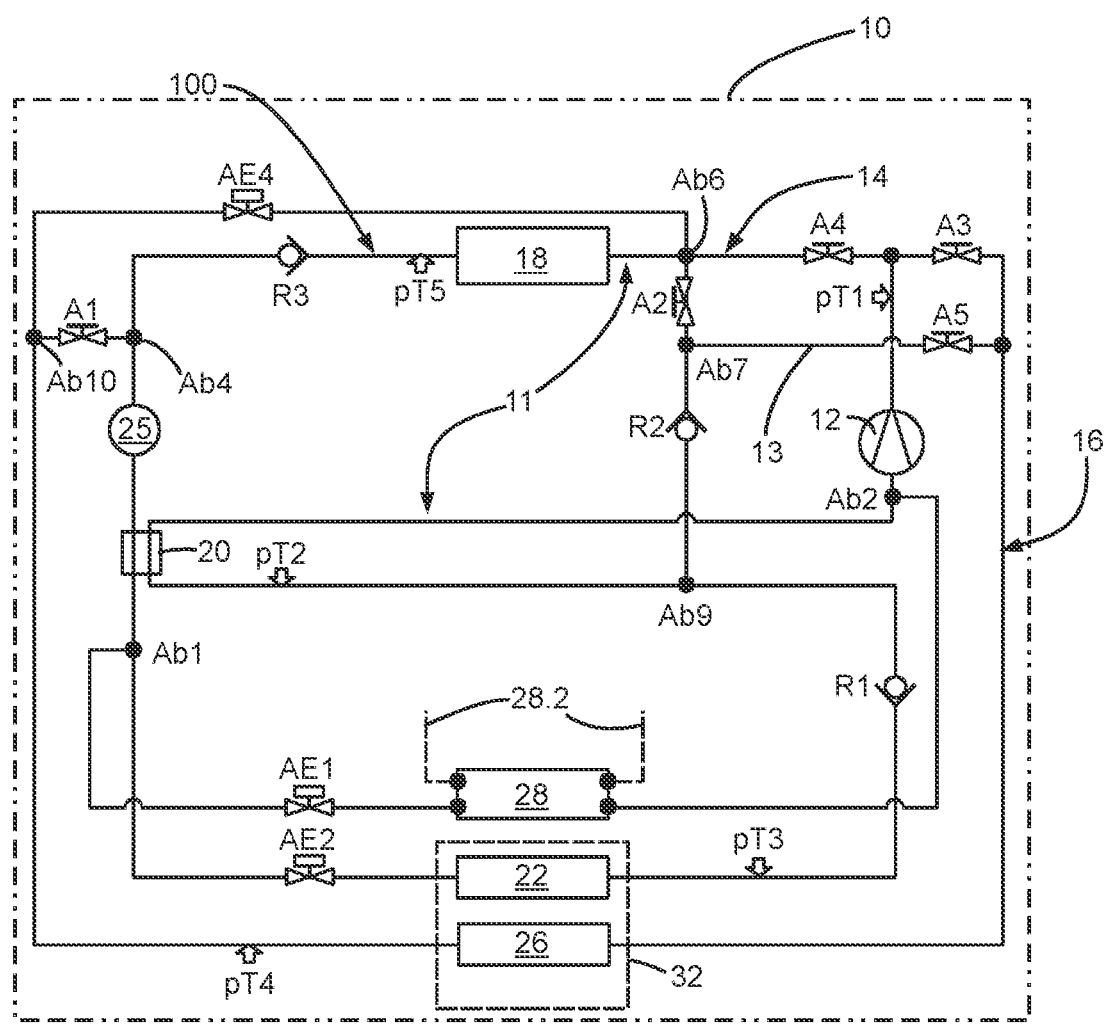
FIG. 7 shows a further expansion stage of the cooling system with heat pump function based on the base system of FIG. 5.

FIG. 7 shows a simplified and schematic representation of a cooling system 10 in which the heat pump function according to the configuration in FIG. 6 is still possible and in which excess heat can also be released.

For this purpose, the secondary branch is extended downstream of the heating register 26 and has an expansion valve AE4, which is preceding the external heat exchanger 18. A shut-off valve A1 is provided between the branch Ab10 and a branch Ab4. In this enhanced embodiment of the cooling system 10 with a heat pump function in comparison to FIG. 6, excess heat can be released via the expansion valve AE4 and the external heat exchanger 18 in a post-heating or reheating operation. The check valves A2 and A4 are closed. The refrigerant then flows from the external heat exchanger 18 in the direction of the first evaporator 22 or the second evaporator (chiller) 28.

Figure 8:
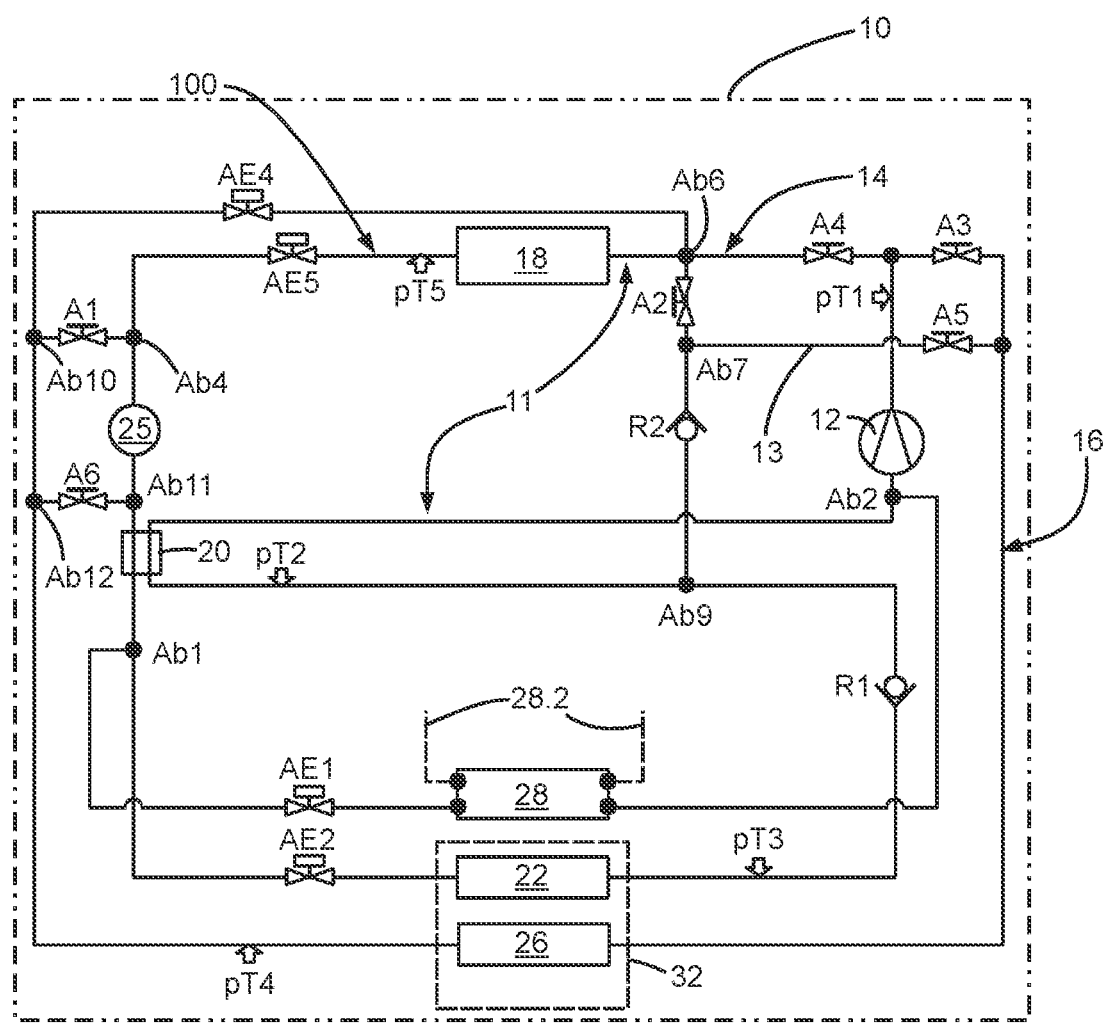
FIG. 8 shows a further expansion stage of the cooling system with heat pump function based on the base system of FIG. 5.

FIG. 8 shows a simplified and schematic representation of a cooling system 10 in which the heat pump function according to the configuration of FIG. 6 or FIG. 7 is still possible and in which an air heat pump function is additionally enabled. For this purpose, another expansion valve AE5 is provided instead of the check valve R3. Another shut-off valve A6 is also provided which is fluidically connected in parallel to the shut-off valve A1. The air heat pump connection is achieved when the shut-off valve A6 is open and the expansion valve AE4 and the shut-off valve A1 are closed. Correspondingly, refrigerant that comes from the heating register 26 can be supplied to the external heat exchanger 18 via the open shut-off valve A6 and the (partially) open expansion valve AE5. The refrigerant can be supplied to the first or/and second evaporator 22, 28 fluidically parallel thereto. After the refrigerant has passed through the external heat exchanger 18, it flows back in the direction of the refrigerant compressor 12 when the shut-off valve A2 is open.

Figure 9:
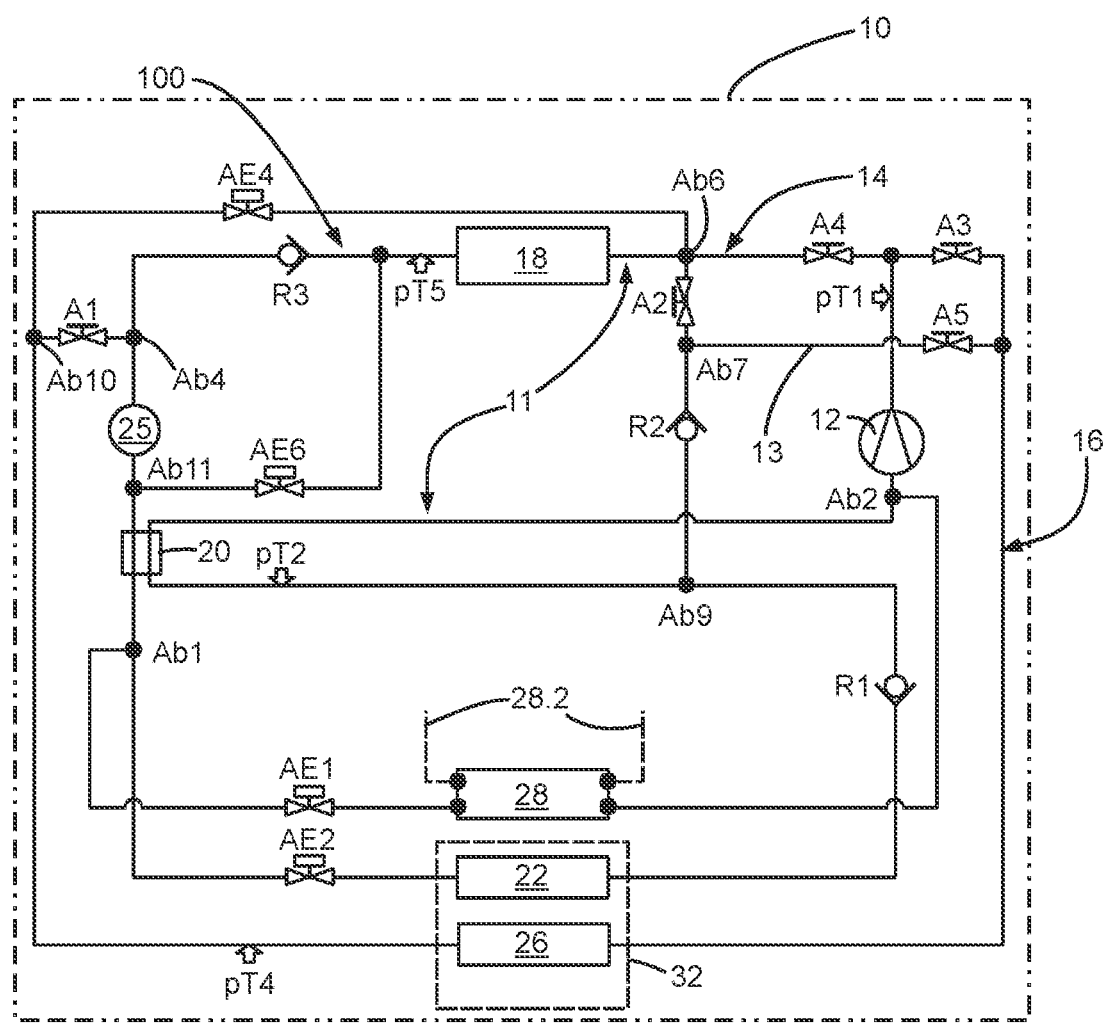
FIG. 9 shows a further expansion stage of the cooling system with heat pump function based on the base system of FIG. 5.

FIG. 9 shows a simplified and schematic representation of a cooling system 10 in which the heat pump function according to the configuration of FIG. 8 is still possible, i.e., including the air heat pump function. Once again a check valve R3 (as in FIG. 7) is arranged instead of the shut-off valve A6 and the expansion valve AE5 (FIG. 8). Furthermore, after the high-pressure collector 25, a bypass line branches off, which has an expansion valve AE6, the bypass line ending between the check valve R3 and the external heat exchanger. The air heat pump connection is achieved (parallel to the water heat pump function) when shut-off valve A1 is open and expansion valve AE4 is closed. Accordingly, refrigerant that comes from the heating register 26 can be supplied to the external heat exchanger 18 via the open shut-off valve A1 and the (partially) open expansion valve AE6. The refrigerant can be supplied to the first or/and second evaporator 22, 28 fluidically parallel thereto. After the refrigerant has passed through the external heat exchanger 18, it flows back in the direction of the refrigerant compressor 12 when the shut-off valve A2 is open.

With regard to the cooling systems 10 of FIGS. 6 to 9, it is also pointed out that a line section between the check valve and the branch Ab9 can also be routed from the check valve R2 to the branch Ab2. In such a case, branch Ab9 would be redundant. In other words, the line section downstream of the check valve R2 can therefore lead into, or be connected upstream or downstream of the internal heat exchanger 20 on the low-pressure side.

The cooling systems 10 described above with the high-pressure collector 25, in particular those in FIGS. 6 to 9, enable selective or parallel water heat pump operation (via the chiller 28) depending on the connection selected or/and air heat pump operation (via the external heat exchanger 18) to provide heat to the cabin airflow.

Another functional, but not further illustrated embodiment of the systems with the option of parallel operation of air and water heat pumps can be provided by modifications in the way the valves work or by adding valves:

An expansion element AE7 downstream of the evaporator 22 (illustrated by dashed lines in FIGS. 4 and 4A) allows an intermediate pressure level to be set in the evaporator 22, such that a dehumidification function is enabled in addition to heat pump operation, particularly at low ambient temperatures, without the evaporator 22 icing up.

The modification of the shut-off valve A2, which is arranged adjacent to the heat exchanger 18, into an expansion element AE8 (illustrated by dashed lines in FIG. 4A) and the simulta-neous connection of an expansion element AE9 (illustrated by dashed lines in FIGS. 4 and 4A) to the chiller 28 enables operation at different (low) pressure levels in addition to parallel or serial operation of the two heat exchangers 18 and 28 at the same pressure level. In particular in parallel operation, pressure levels can be set with:

Pressure in the chiller 28 is greater than the pressure in the heat exchanger 18;
Pressure in the chiller 28 is lower than the pressure in the heat exchanger 28;

Pressure in the chiller 28 is equal to the pressure in the heat exchanger 18.

It is generally pointed out that all figures show multiple sensors, which are usually labeled pTX (X=1 . . . n). The pTX sensors are used to record the pressure or/and temperature of the refrigerant. It is pointed out that the number of sensors pTX (X=1 . . . n) and their arrangement in all figures is only shown as an example. A cooling system 10 according to FIGS. 1 to 9 can also have fewer or more sensors. In the examples shown, combined pressure/temperature sensors pTX are shown as the sensors. However, it is just as conceivable that sensors that are separate from one another are used for measuring pressure or temperature and, if necessary, are also arranged spatially separately from one another along the refrigerant lines. However, any sensor pTX explicitly mentioned in the description or/and shown in the figures can be understood as a possibly relevant part of the refrigerant circuit and claimed if required, in particular to describe the structure of the cooling system 10 more precisely where required. It is also pointed out that all figures show multiple branches or nodes with AbY (Y=1 . . . n), not each of which is explicitly described. Note that all figures show the number of branches AbY (Y=1 . . . n) or the arrangement thereof as an example only. A cooling system 10 according to FIGS. 1 to 9 can also have fewer or more branches. However, any branch AbY explicitly mentioned in the description or/and shown in the figures can be understood as a possibly relevant part of the refrigerant circuit and claimed if required, in particular to describe the structure of the cooling system 10 more precisely where required.

The invention claimed is:

1. A cooling system with a heat pump function for a motor vehicle, comprising
 a base system with
 a refrigerant compressor;
 a directly or indirectly working external heat exchanger which is arranged downstream of the refrigerant compressor;
 a directly or indirectly working first evaporator as part of an air conditioning device for the interior air conditioning of the motor vehicle, the first evaporator is arranged downstream of the external heat exchanger and which is preceded by a first expansion element;
 at least one second evaporator, in particular a chiller, as part of a cooling device of an electric drive or storage unit, the second evaporator is arranged fluidically parallel to the first evaporator and which is preceded by a second expansion element;
 at least one low-pressure side collector arranged downstream of the first and second evaporators, or at least one high-pressure side collector arranged downstream of the external heat exchanger and upstream of the first and second evaporators,
 wherein the base system forms a primary line and, to achieve the heat pump function, can be fluidically connected to a secondary line which branches off from the base system downstream of the refrigerant compressor and which has a second heat exchanger working as a heat source for direct or indirect air heating, in particular a heating register, which is part of the air conditioning device,
 wherein an expansion valve is provided in the secondary branch downstream of the heating register, wherein the expansion valve is preceding the external heat exchanger.

2. The cooling system according to claim 1, wherein a valve arrangement is provided downstream of the refrigerant compressor, which valve arrangement is designed to optionally direct the flow of refrigerant to the primary line or/and to the secondary line.

3. The cooling system according to claim 1, wherein the cooling system has an internal heat exchanger which is preceded by the high-pressure-side collector on the high-pressure side or by the low-pressure-side collector on the low-pressure side.

4. The cooling system according to claim 1, wherein, downstream of the heating register and upstream of the first expansion element, at least one check valve or a shut-off valve is arranged or/and settable in such a way that refrigerant flow from the secondary branch to the primary branch is optionally enabled and refrigerant flow from the primary branch to the secondary branch is blocked.

5. The cooling system according to claim 1, wherein a low-pressure side branch is arranged downstream of the first evaporator, which branch is connected to a suction section, wherein refrigerant from the primary line or/and the secondary line can be suctioned off through the suction section.

6. The cooling system according to claim 5, wherein a check valve is provided between the first evaporator and the low-pressure side branch, which pre-vents refrigerant from flowing back to the first evaporator.

7. The cooling system according to claim 1, wherein, downstream of the external heat exchanger in the primary line, a check valve is arranged in such a way to prevent a return flow of refrigerant, which is in particular introduced from the secondary line into the primary line, to the external heat exchanger.

8. The cooling system according to claim 1, wherein a bypass line which has an expansion element branches off downstream of the high-pressure collector, wherein the bypass line ends between a check valve (R3) and the external heat exchanger, wherein the check valve is arranged between the high-pressure collector and the external heat exchanger.

9. The cooling system according to claim 1, wherein the cooling system is adapted to be operated in a post-heating mode, in which the refrigerant, starting from the refrigerant compressor, flows successively through the following components of the cooling system: heating register in the secondary line and first evaporator in the primary line.

10. The cooling system according to claim 1, wherein the cooling system is adapted to be operated in a triangular process in which the refrigerant flows successively through the following components of the cooling system, starting from the refrigerant compressor: heating register in the secondary line, second evaporator in the primary line with standing coolant in the cooling device that is assigned to the second evaporator.

11. The cooling system according to claim 1, wherein the base system is de-signed as a basic module which can be coupled with at least one expansion module which has at least the secondary line and the heating register or/and can be connected to or/and integrated with the same.

12. A motor vehicle, in particular an electrically or partially electrically driven motor vehicle, with the cooling system according to claim 1.

13. The cooling system according to claim 2, wherein the cooling system has an internal heat exchanger which is preceded by the high-pressure-side collector on the high-pressure side or by the low-pressure-side collector on the low-pressure side.

14. The cooling system according to claim 2, wherein, downstream of the heating register and upstream of the first expansion element, at least one check valve or a shut-off valve is arranged or/and settable in such a way that refrigerant flow from the secondary branch to the primary branch is optionally enabled and refrigerant flow from the primary branch to the secondary branch is blocked.

15. The cooling system according to claim 3, wherein, downstream of the heating register and upstream of the first expansion element, at least one check valve or a shut-off valve is arranged or/and settable in such a way that refrigerant flow from the secondary branch to the primary branch is optionally enabled and refrigerant flow from the primary branch to the secondary branch is blocked.

16. The cooling system according to claim 2, wherein a low-pressure side branch is arranged downstream of the first evaporator, which branch is connected to a suction section, wherein refrigerant from the primary line or/and the secondary line can be suctioned off through the suction section.

17. The cooling system according to claim 3, wherein a low-pressure side branch is arranged downstream of the first evaporator, which branch is connected to a suction section, wherein refrigerant from the primary line or/and the secondary line can be suctioned off through the suction section.

18. The cooling system according to claim 4, wherein a low-pressure side branch is arranged downstream of the first evaporator, which branch is connected to a suction section, wherein refrigerant from the primary line or/and the secondary line can be suctioned off through the suction section.

19. The cooling system according to claim 2, wherein, downstream of the external heat exchanger in the primary line, a check valve is arranged in such a way to prevent a return flow of refrigerant, which is in particular introduced from the secondary line into the primary line, to the external heat exchanger.

\* \* \* \* \*